US012192699B2

(12) United States Patent
Xiao et al.

(10) Patent No.: US 12,192,699 B2
(45) Date of Patent: Jan. 7, 2025

(54) ELECTRONIC TERMINAL WITH A SWITCHING STRUCTURE

(71) Applicant: AAC Microtech (Changzhou) Co., Ltd., Changzhou (CN)

(72) Inventors: Mushu Xiao, Shenzhen (CN); Shuwen Wu, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 153 days.

(21) Appl. No.: 17/876,514

(22) Filed: Jul. 28, 2022

(65) Prior Publication Data

US 2023/0209250 A1 Jun. 29, 2023

(30) Foreign Application Priority Data

Dec. 29, 2021 (CN) ........................ 202123391791.X

(51) Int. Cl.
*H04R 1/34* (2006.01)
*H04R 1/02* (2006.01)

(52) U.S. Cl.
CPC ............. *H04R 1/345* (2013.01); *H04R 1/025* (2013.01); *H04R 1/028* (2013.01); *H04R 2499/11* (2013.01)

(58) Field of Classification Search
CPC ........ H04R 1/345; H04R 1/025; H04R 1/028; H04R 1/2857; H04R 1/2884; H04R 1/2892; H04R 2499/11; H04R 2499/15; H04R 2201/029
USPC .................................. 381/334, 333, 332, 87
See application file for complete search history.

(56) References Cited

U.S. PATENT DOCUMENTS

2012/0321120 A1* 12/2012 Han ......................... H04R 9/06 381/387
2015/0340795 A1* 11/2015 Lee ........................ H04R 1/086 381/334
2017/0127176 A1* 5/2017 Liu ........................ H04R 1/345

(Continued)

FOREIGN PATENT DOCUMENTS

CN 206490819 U * 9/2017 ............... H04R 9/06
CN 111787456 A * 10/2020 ............... H04R 1/20
CN 111885238 A * 11/2020 ............. H04M 1/02

(Continued)

*Primary Examiner* — Ahmad F. Matar
*Assistant Examiner* — Sabrina Diaz
(74) *Attorney, Agent, or Firm* — W&G Law Group

(57) ABSTRACT

The present disclosure discloses electronic terminal including housing, sound producing device and switching structure, and first sound cavity channel and second sound cavity channel formed in the housing. The sound producing device defines sound producing cavity jointly with housing. The electronic terminal further includes mounting groove formed in housing. The switching structure includes baffle slidably arranged in mounting groove and driving portion driving baffle to slide in mounting groove. The driving portion drives baffle to slide into first sound cavity channel or the second sound cavity channel, to close first sound cavity channel or the second sound cavity channel. The baffle can be driven to slide in mounting groove to selectively close first sound cavity channel or second sound cavity channel, to prevent the problem that the terminal, when using one of the first sound cavity channel and the second sound cavity channel, is affected by the other.

3 Claims, 15 Drawing Sheets

(56) References Cited

U.S. PATENT DOCUMENTS

| | | | | |
|---|---|---|---|---|
| 2021/0392221 | A1* | 12/2021 | Lin | H04M 1/605 |
| 2023/0412955 | A1* | 12/2023 | Kuroda | H04R 1/24 |

FOREIGN PATENT DOCUMENTS

| | | | | | |
|---|---|---|---|---|---|
| CN | 106162467 | B | * | 12/2021 | H04R 9/02 |
| CN | 114979337 | A | * | 8/2022 | H04M 1/03 |
| CN | 112689041 | B | * | 5/2023 | H04M 1/03 |
| CN | 112272250 | B | * | 8/2023 | H04M 1/035 |

* cited by examiner

A-A

C-C

ELECTRONIC TERMINAL WITH A SWITCHING STRUCTURE

TECHNICAL FIELD

The present disclosure relates to the technical field of terminals, and in particular, to an electronic terminal.

BACKGROUND

In an electronic terminal, in order to achieve miniaturization and a stereo environment, a receiver and a speaker may generally be combined into one device, so that the electronic terminal has a smaller volume and is more convenient for users to carry.

In order to further reduce the volume of the electronic terminal, a receiver sound cavity channel and a speaker sound cavity channel are designed to be close to each other, and share part of the sound cavity channels, so as to reduce the volume occupied by the two sound cavity channels with separated design.

Although an overall volume of the electronic terminal can be reduced by combining the receiver and the speaker into one and by combining part of the receiver sound cavity channel and the speaker sound cavity channel, the electronic terminal, when using one of the receiver sound cavity channel and the speaker sound cavity channel, is easily affected by the other because part of the receiver sound cavity channel and the speaker sound cavity channel is required to be shared.

SUMMARY

An objective of the present disclosure is to provide an electronic terminal so at to solve the problem that the existing electronic terminal, when using one of the receiver sound cavity channel and the speaker sound cavity channel, is easily affected by the other on the premise of combining the receiver and the speaker into one and using part of the shared sound cavity channel to reduce the overall volume.

In order to achieve the above objective, the present disclosure provides an electronic terminal, the electronic terminal including a housing, a sound producing device and a switching structure arranged in the housing, and a first sound cavity channel and a second sound cavity channel formed in the housing and passing through the housing to be communicated with the outside, the sound producing device defining a sound producing cavity jointly with the housing, the sound producing cavity being communicated with the first sound cavity channel and the second sound cavity channel, wherein the electronic terminal further includes a mounting groove formed in the housing, the switching structure includes a baffle slidably arranged in the mounting groove and a driving portion driving the baffle to slide in the mounting groove, the side of the mounting groove close to the first sound cavity channel is communicated with the first sound cavity channel, the side of the mounting groove close to the second sound cavity channel is communicated with the second sound cavity channel, and the driving portion drives the baffle to slide in the mounting groove into the first sound cavity channel or the second sound cavity channel, so as to close the first sound cavity channel or the second sound cavity channel.

Furthermore, an inner side of the housing is recessed to form a first receiving groove and a second receiving groove communicated with each other, the electronic terminal further includes a cover plate received in the housing, and the cover plate is arranged to cover the first receiving groove and the second receiving groove; the sound producing device is received in the first receiving groove and is spaced from the cover plate to form the sound producing cavity, the cover plate and the second receiving groove jointly define the first sound cavity channel, the second sound cavity channel, and the mounting groove, and the mounting groove is located between the first sound cavity channel and the second sound cavity channel; the housing is further provided with a limit groove passing therethrough and extending along a sliding direction of the baffle, the driving portion is a slide arm fixed to the baffle, the slide arm extends into the limit groove and is exposed to the limit groove, and the slide arm slides in the limit groove to drive the baffle to slide in the mounting groove into the first sound cavity channel or the second sound cavity channel.

Furthermore, the end of the slide arm away from the baffle is in a same horizontal plane as the side of the limit groove away from the sound producing device.

Furthermore, the housing includes a bottom wall, a side wall bending and extending from a periphery of the bottom wall, an extension wall formed by horizontally protruding from the side wall to a direction close to the second sound cavity channel, and a panel covering the side wall; the first sound cavity channel passes through the side wall to be communicated with the outside, and the second sound cavity channel passes through the extension wall to be communicated with the outside; and the first receiving groove and the second receiving groove are formed by recessing the side of the bottom wall close to the panel.

Furthermore, an inner side of the housing is recessed to form a first receiving groove and a second receiving groove communicated with each other, the electronic terminal further includes a cover plate received in the housing, and the cover plate is arranged to cover the first receiving groove and the second receiving groove; the sound producing device is received in the first receiving groove and is spaced from the cover plate to form the sound producing cavity, the cover plate and the second receiving groove jointly define the first sound cavity channel, the second sound cavity channel, and the mounting groove, and the mounting groove is located between the first sound cavity channel and the second sound cavity channel; the driving portion is a motor arranged in the housing, and an output end of the motor is in transmission connection with the baffle to drive the baffle to slide in the mounting groove into the first sound cavity channel or the second sound cavity channel.

Furthermore, the output end of the motor is provided with a gear, the baffle is provided with a tooth-shaped structure along a sliding direction of the baffle, and the gear is engaged with the tooth-shaped structure to realize the transmission connection between the motor and the baffle.

Furthermore, the baffle is provided with a connecting hole passing therethrough, the connecting hole extends along the sliding direction, and the tooth-shaped structure is a rack fixed to one side of an inner wall of the connecting hole and extending along the sliding direction.

Furthermore, two racks are provided and respectively arranged on two opposite sides of the inner wall of the connecting hole.

Compared with the related art, according to the electronic terminal in the present disclosure, the mounting groove is formed on the housing, the side of the mounting groove close to the first sound cavity channel is communicated with the first sound cavity channel, the side of the mounting groove close to the second sound cavity channel is communicated with the second sound cavity channel, a baffle is slidably arranged in the mounting groove, and a driving portion driving the baffle to slide in the mounting groove is arranged. In this way, the baffle can be driven by the driving portion to slide in the mounting groove into the first sound cavity channel or the second sound cavity channel to selectively close the first sound cavity channel or the second sound cavity channel, so as to prevent the problem that the terminal, when using one of the first sound cavity channel and the second sound cavity channel, is affected by the other.

BRIEF DESCRIPTION OF DRAWINGS

In order to more clearly illustrate the technical solutions in embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art from the provided drawings without creative efforts.

Figure 1:
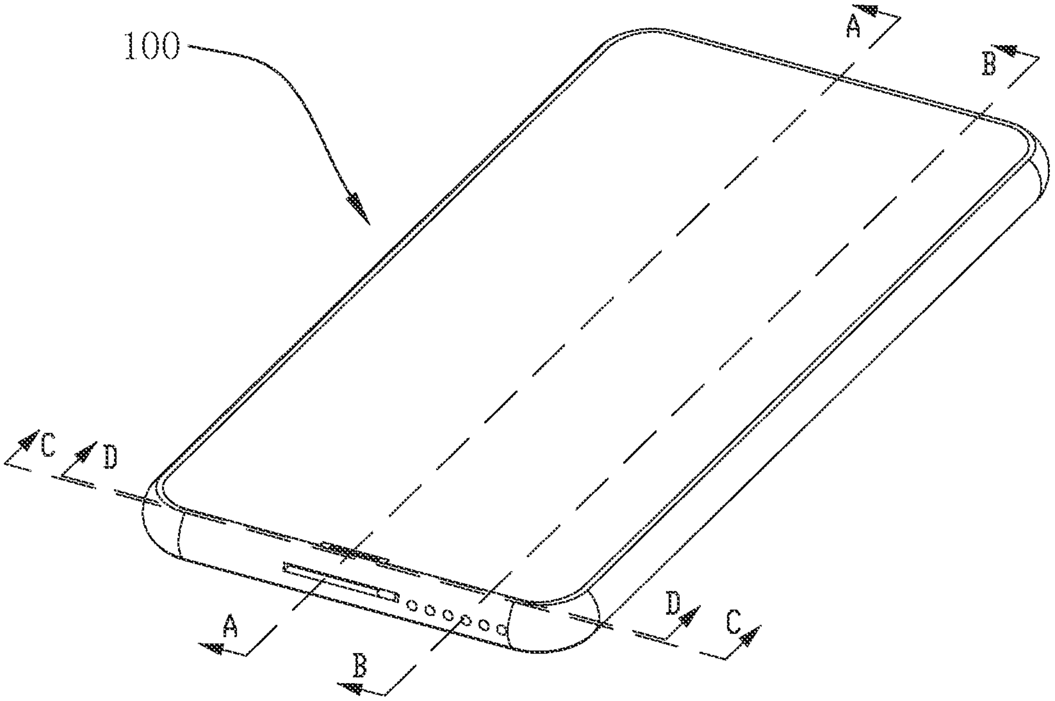
FIG. 1 is a schematic diagram of a three-dimensional structure of mounting of a first switching structure for a terminal sound cavity channel to a terminal according to the present disclosure.

In the drawings, 100, electronic terminal; 1, housing; 11, first sound cavity channel; 12, second sound cavity channel; 13, sound producing cavity; 131, first receiving groove; 132, second receiving groove; 14, mounting groove; 141, limit groove; 142, through groove; 15, cover plate; 17, bottom wall; 171, side wall; 172, extension wall; 173, panel; 2, sound producing device; 3, switching structure; 31, baffle; 311, rack; 312, connecting hole; 32, driving portion; 321, motor; 3211, gear.

DESCRIPTION OF EMBODIMENTS

The technical solutions in the embodiments of the present disclosure will be described clearly and completely below with reference to the accompanying drawings in the embodiments of the present disclosure. Apparently, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

Embodiment 1

Figure 2:
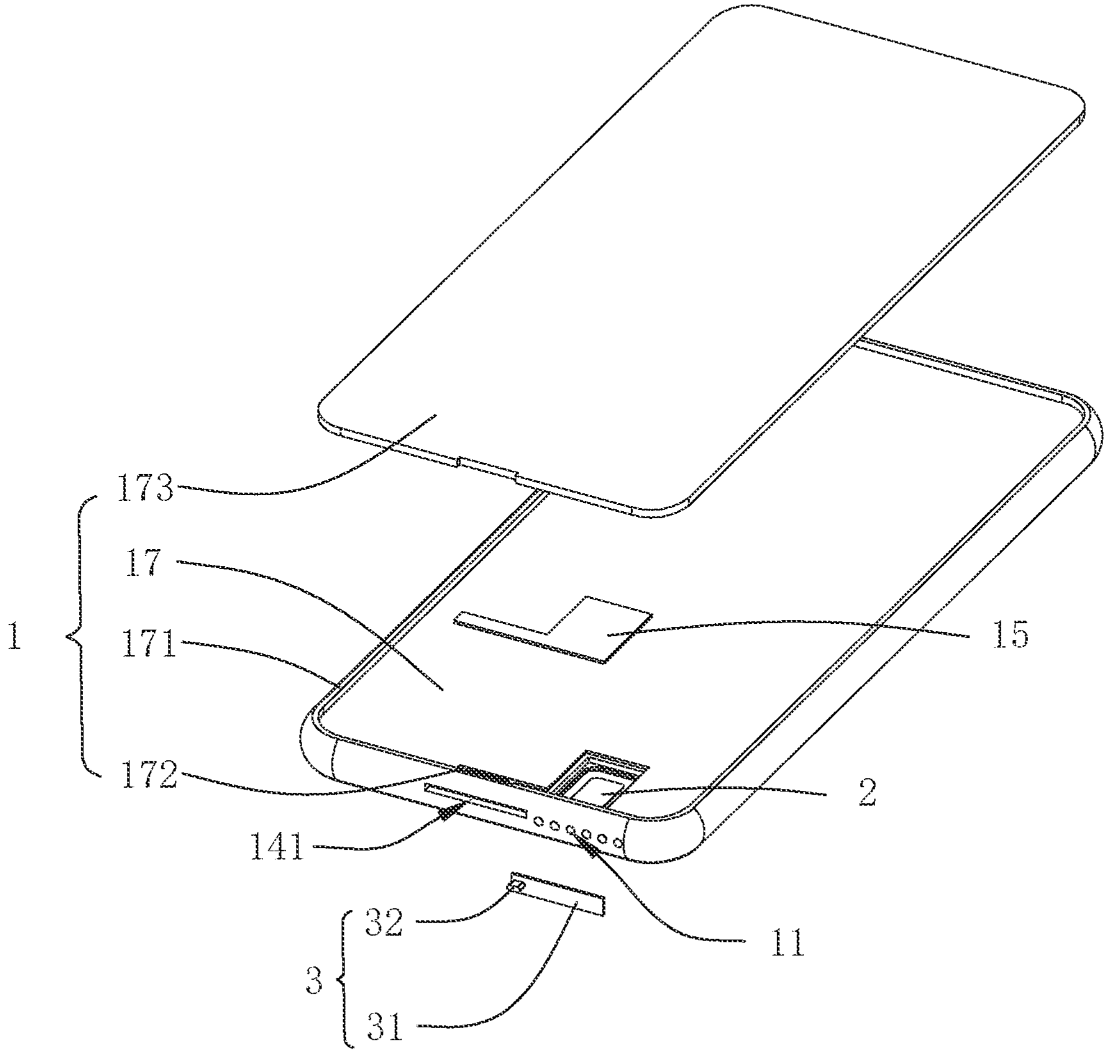
FIG. 2 is a first schematic exploded view of mounting of the first switching structure for the terminal sound cavity channel to the terminal according to the present disclosure.
Figure 3:
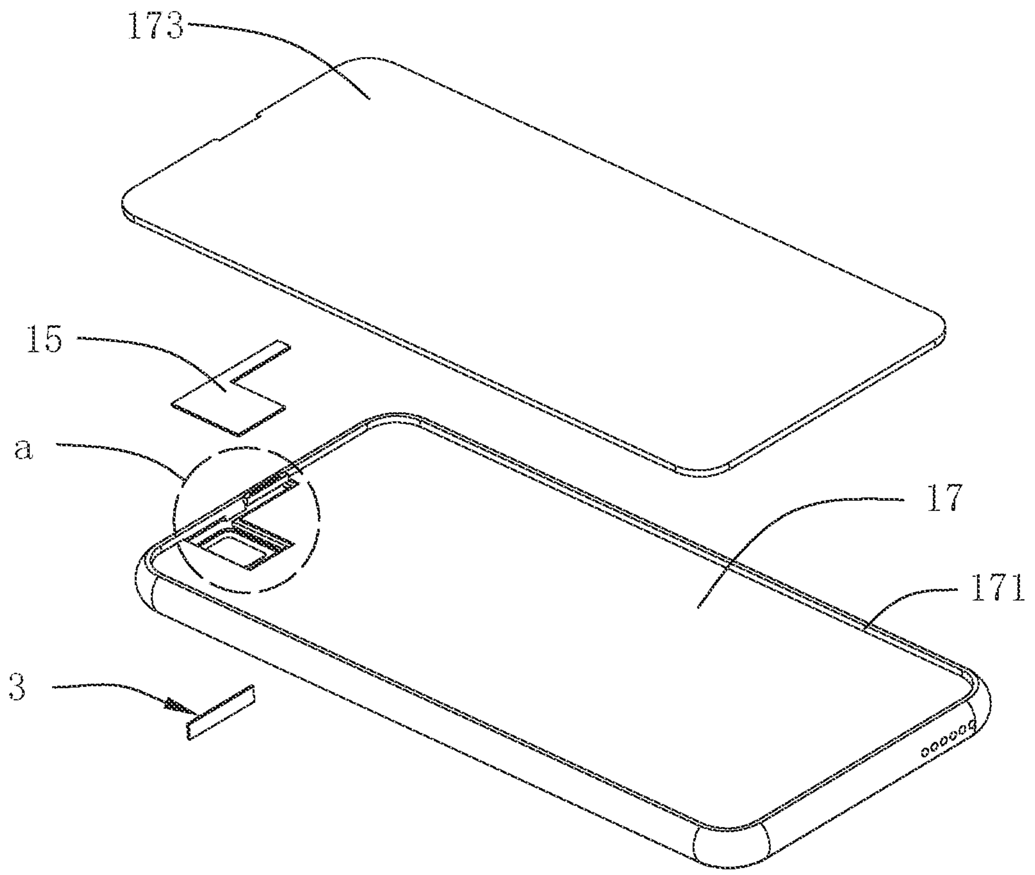
FIG. 3 is a second schematic exploded view of mounting of the first switching structure for the terminal sound cavity channel to the terminal according to the present disclosure.
Figure 4:
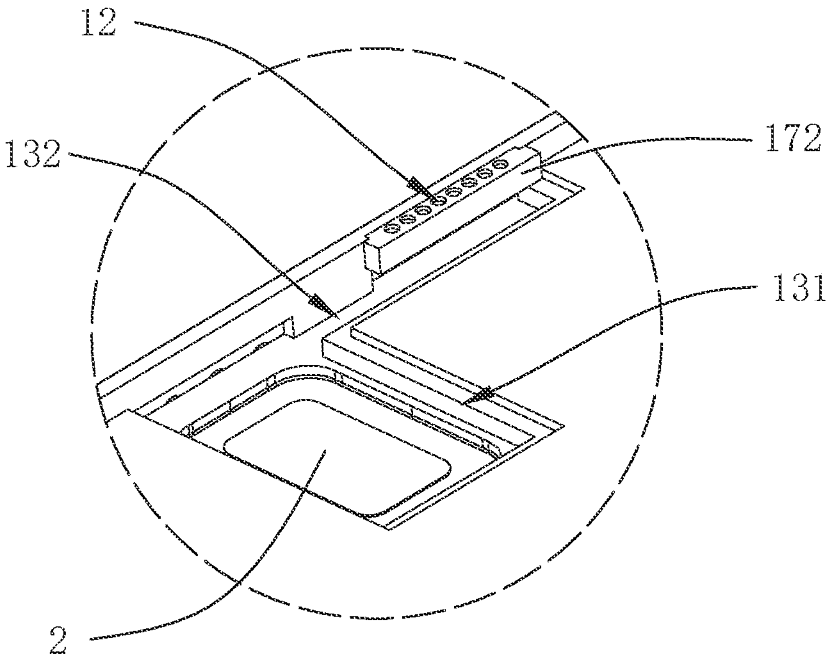
FIG. 4 is an enlarged view of Part a in FIG. 3.
Figure 5:
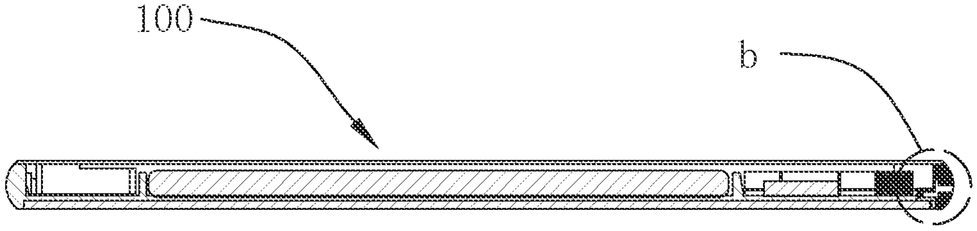
FIG. 5 is a sectional view taken along a line A-A in FIG. 1.
Figure 6:
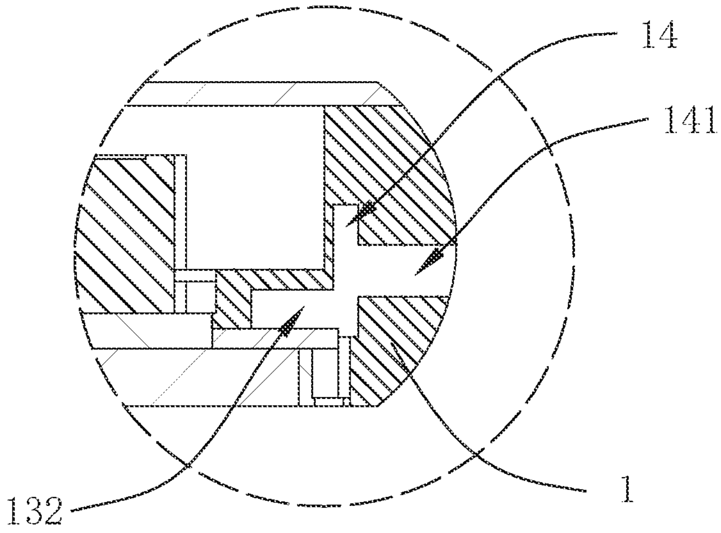
FIG. 6 is an enlarged view of Part b in FIG. 5.
Figure 7:
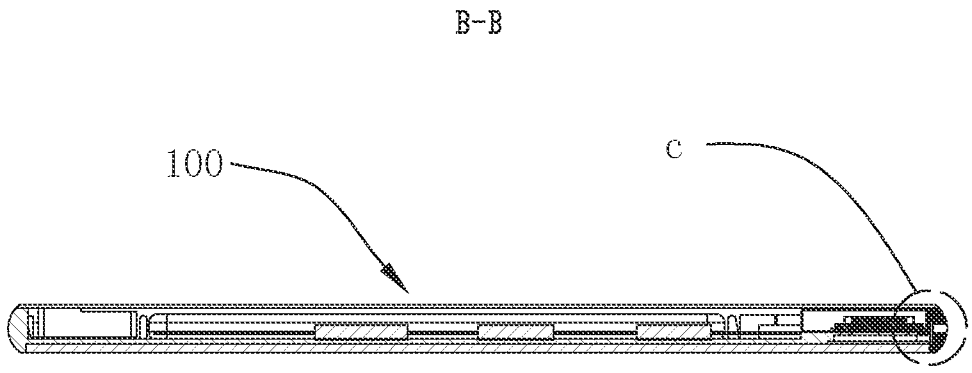
FIG. 7 is a sectional view taken along a line B-B in FIG. 1.
Figure 8:
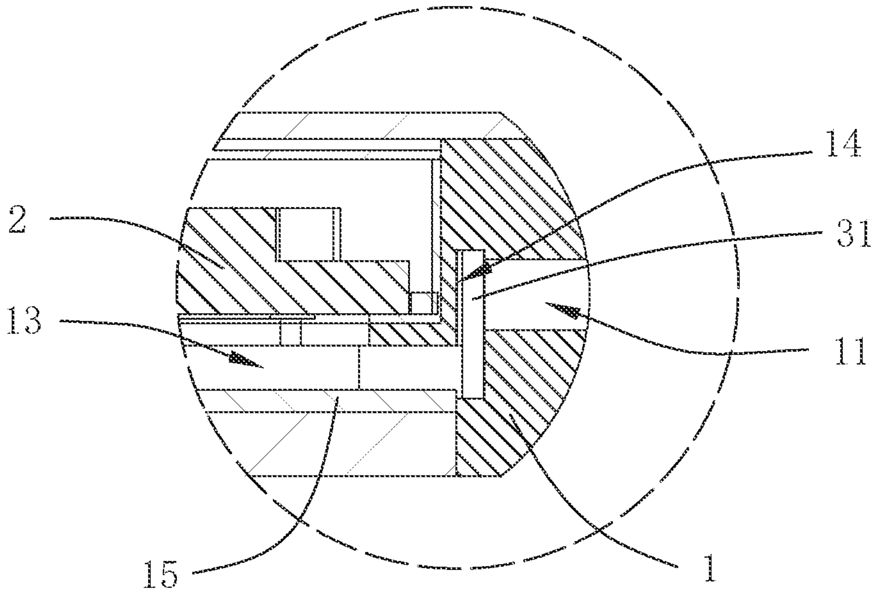
FIG. 8 is an enlarged view of Part c in FIG. 7.
Figure 9:
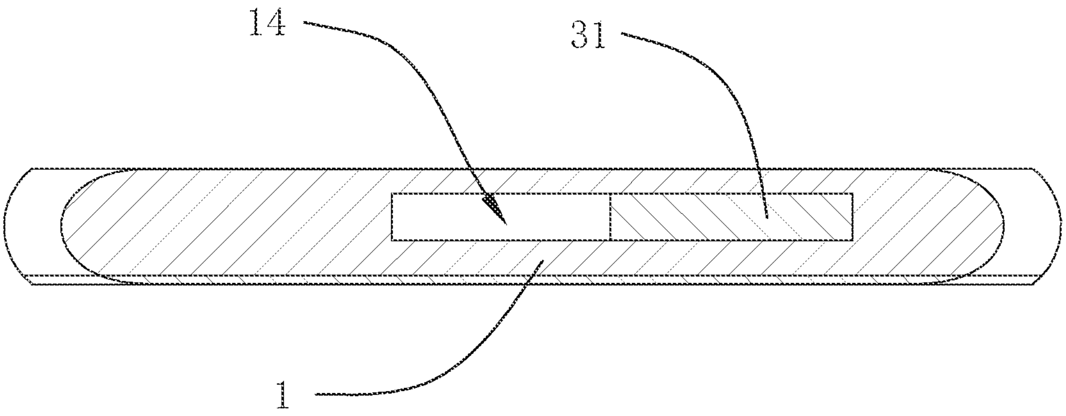
FIG. 9 is a sectional view taken along a line C-C in FIG. 1.
Figure 10:
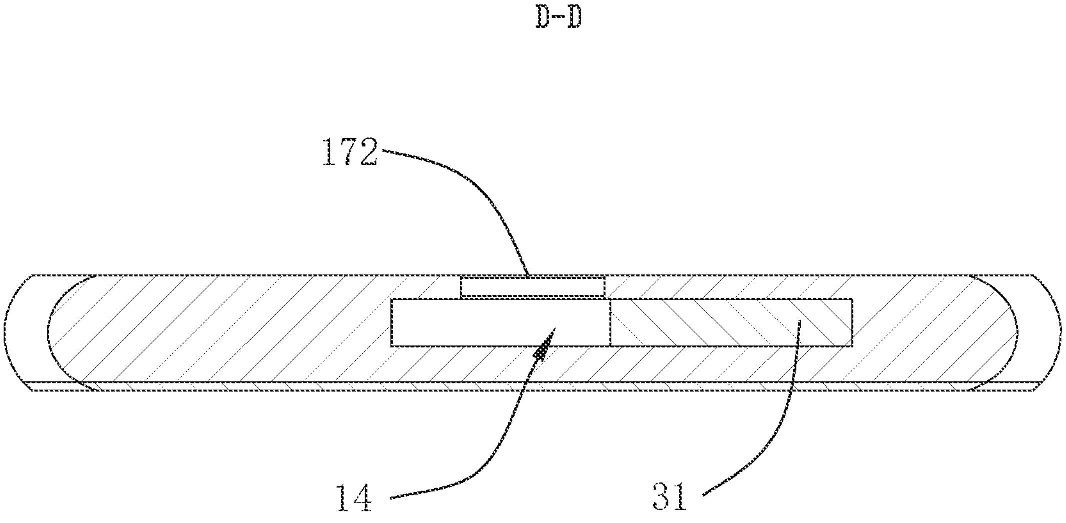
FIG. 10 is a sectional view taken along a line D-D in FIG. 1.

This embodiment provides an electronic terminal 100. Referring to FIG. 1 to FIG. 10, the electronic terminal 100 includes a housing 1, a sound producing device 2 and a switching structure 3 arranged in the housing 1, and a first sound cavity channel 11 and a second sound cavity channel 12 formed in the housing 1 and passing through the housing 1 to be communicated with the outside. The sound producing device 2 defines a sound producing cavity 13 jointly with the housing 1. The sound producing cavity 13 is communicated with the first sound cavity channel 11 and the second sound cavity channel 12. The electronic terminal 100 further includes a mounting groove 14 formed in the housing 1.

The switching structure 3 includes a baffle 31 slidably arranged in the mounting groove 14 and a driving portion 32 driving the baffle 31 to slide in the mounting groove 14. The side of the mounting groove 14 close to the first sound cavity channel 11 is communicated with the first sound cavity channel 11. The side of the mounting groove 14 close to the second sound cavity channel 12 is communicated with the second sound cavity channel 12. The driving portion 32 drives the baffle 31 to slide in the mounting groove 14 into the first sound cavity channel 11 or the second sound cavity channel 12, so as to close the first sound cavity channel 11 or the second sound cavity channel 12

Specifically, an inner side of the housing 1 is recessed to form a first receiving groove 131 and a second receiving groove 132 communicated with each other, the electronic terminal 100 further includes a cover plate 15 received in the housing 1, and the cover plate 15 is arranged to cover the first receiving groove 131 and the second receiving groove 132.

Specifically, the sound producing device 2 is received in the first receiving groove 131 and is spaced from the cover plate 15 to form the sound producing cavity 13, the cover plate 15 and the second receiving groove 132 jointly define the first sound cavity channel 11, the second sound cavity channel 12, and the mounting groove 14, and the mounting groove 14 is located between the first sound cavity channel 11 and the second sound cavity channel 12.

Specifically, the housing 1 is further provided with a limit groove 141 passing therethrough and extending along a sliding direction of the baffle 31, the driving portion 32 is a slide arm fixed to the baffle 31, the slide arm extends into the limit groove 141 and is exposed to the limit groove 141, and the slide arm slides in the limit groove 141 to drive the baffle 31 to slide in the mounting groove 14 into the first sound cavity channel 11 or the second sound cavity channel 12.

Furthermore, the end of the slide arm away from the baffle 31 is in a same horizontal plane as the side of the limit groove 141 away from the sound producing device 2. In this way, accidental touch caused by excessive outward protruding of the slide arm can be prevented.

Specifically, the housing 1 includes a bottom wall 17, a side wall 171 bending and extending from a periphery of the bottom wall 17, an extension wall 172 formed by horizontally protruding from the side wall 171 to a direction close to the second sound cavity channel 12, and a panel 173 covering the side wall 171.

The first sound cavity channel 11 passes through the side wall 171 to be communicated with the outside, and the second sound cavity channel 12 passes through the extension wall 172 to be communicated with the outside. The first receiving groove 131 and the second receiving groove 132 are formed by recessing the side of the bottom wall 17 close to the panel 173.

In this embodiment, the first sound cavity channel 11 is a receiver sound cavity channel, and the second sound cavity channel 12 is a speaker sound cavity channel.

If the electronic terminal 100 in this embodiment is required to realize a receiver function, the baffle 31 is kept at an initial position to close the second sound cavity channel, so that the second sound cavity channel is in a closed state and cannot be communicated with the sound producing cavity, and a speaker function cannot be realized accordingly. In this case, the first sound cavity channel is in an open state, can be communicated with the sound producing cavity, and can realize the receiver function accordingly without being affected by the second sound cavity channel 12.

If the speaker function is required to be realized, the baffle 31 is driven by the driving portion 32 to slide along the mounting groove 14 to the first sound cavity channel 11 to close the first sound cavity channel, so that the first sound cavity channel is in a closed state and cannot be communicated with the sound producing cavity 13, and the speaker function cannot be realized accordingly. In this case, the second sound cavity channel is in an open state, can be communicated with the sound producing cavity 13, and can realize the speaker function accordingly without being affected by the first sound cavity channel 11.

According to the electronic terminal 100 in this embodiment, the mounting groove 14 is formed on the housing 1, the side of the mounting groove 14 close to the first sound cavity channel 11 is communicated with the first sound cavity channel 11, the side of the mounting groove 14 close to the second sound cavity channel 12 is communicated with the second sound cavity channel 12, a baffle 31 is slidably arranged in the mounting groove 14, and a driving portion 32 driving the baffle 31 to slide in the mounting groove 14 is arranged. In this way, the baffle 31 can be driven by the driving portion 32 to slide in the mounting groove 14 into the first sound cavity channel 11 or the second sound cavity channel 12 to selectively close the first sound cavity channel 11 or the second sound cavity channel 12, so as to prevent the problem that the terminal, when using one of the first sound cavity channel 11 and the second sound cavity channel 12, is affected by the other.

Embodiment 2

Figure 11:
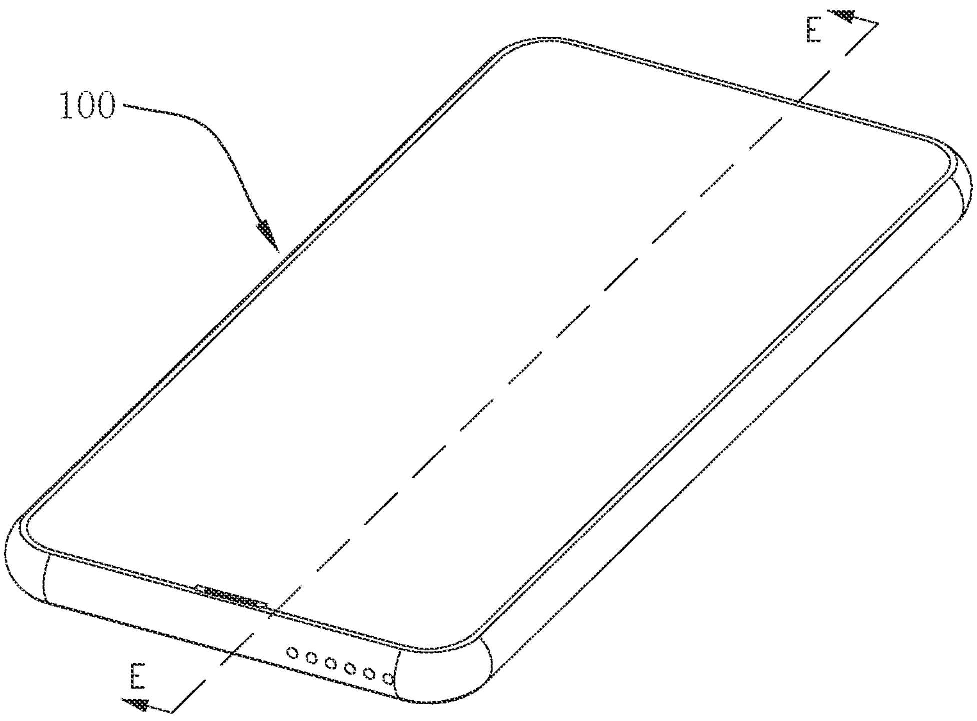
FIG. 11 is a schematic diagram of a three-dimensional structure of mounting of a second switching structure for the terminal sound cavity channel to the terminal according to the present disclosure.
Figure 12:
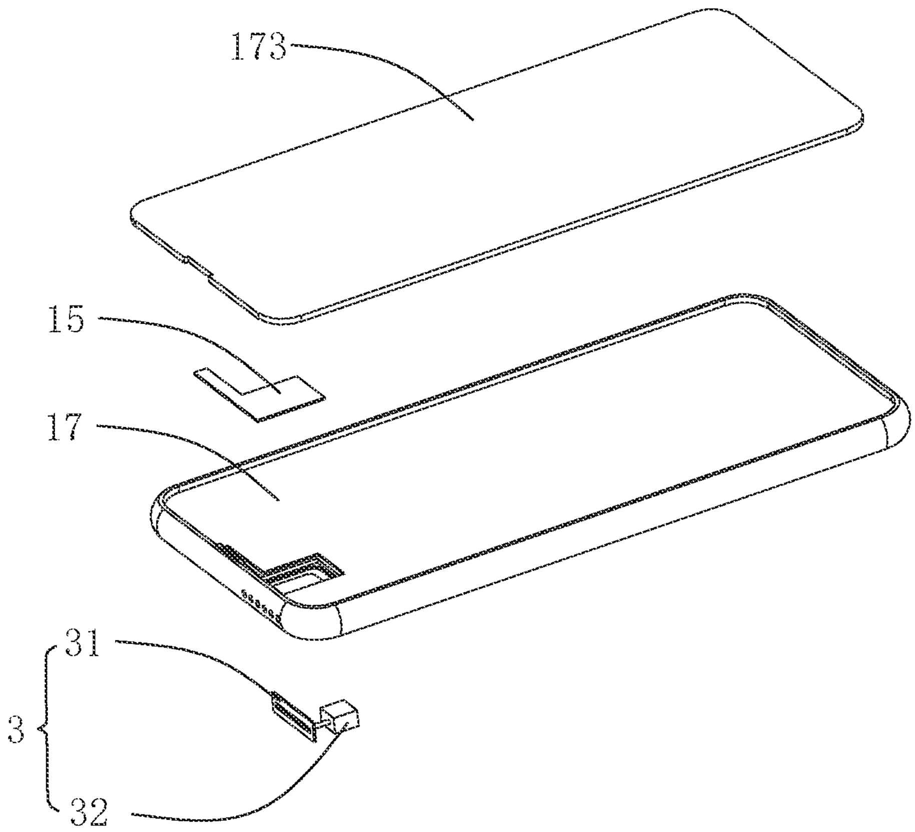
FIG. 12 is a schematic exploded view of mounting of the second switching structure for the terminal sound cavity channel to the terminal according to the present disclosure.
Figure 13:
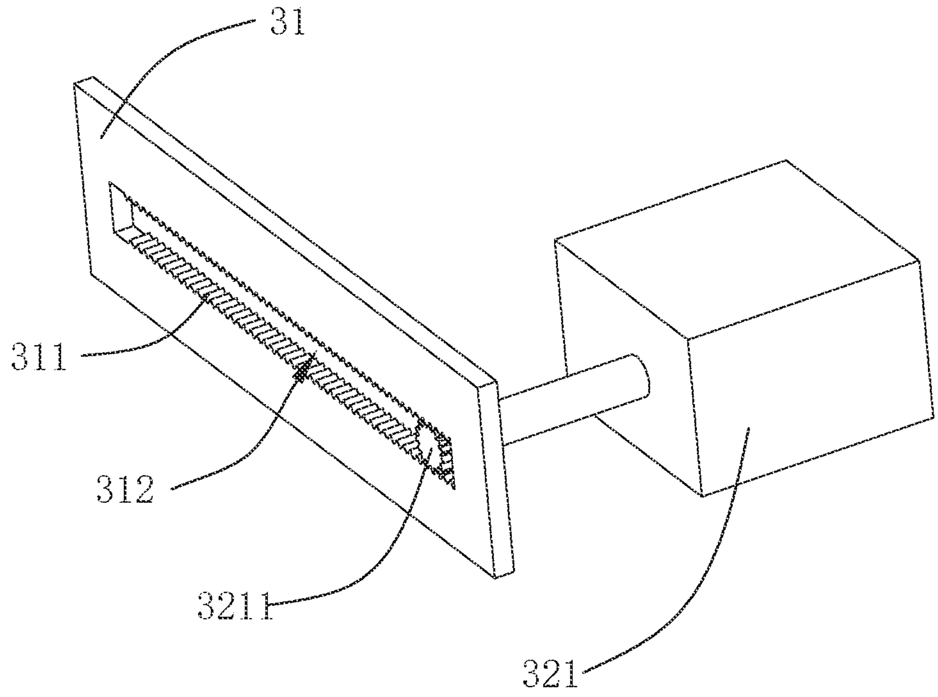
FIG. 13 is a schematic structural diagram of a motor and a baffle in the second switching structure for the terminal sound cavity channel according to the present disclosure.
Figure 14:
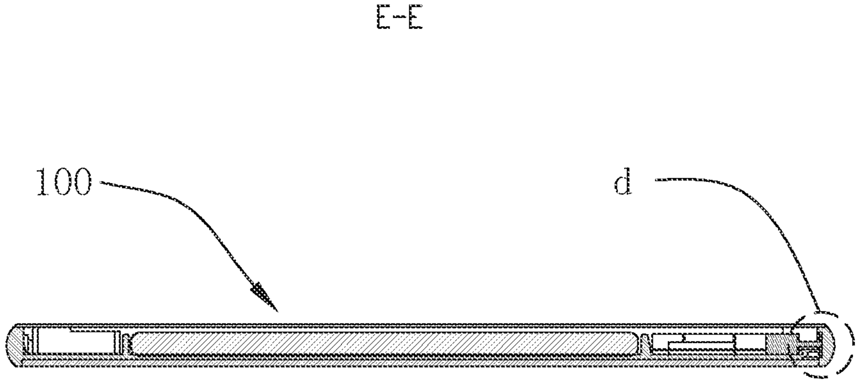
FIG. 14 is a sectional view taken along a line E-E in FIG. 11.
Figure 15:
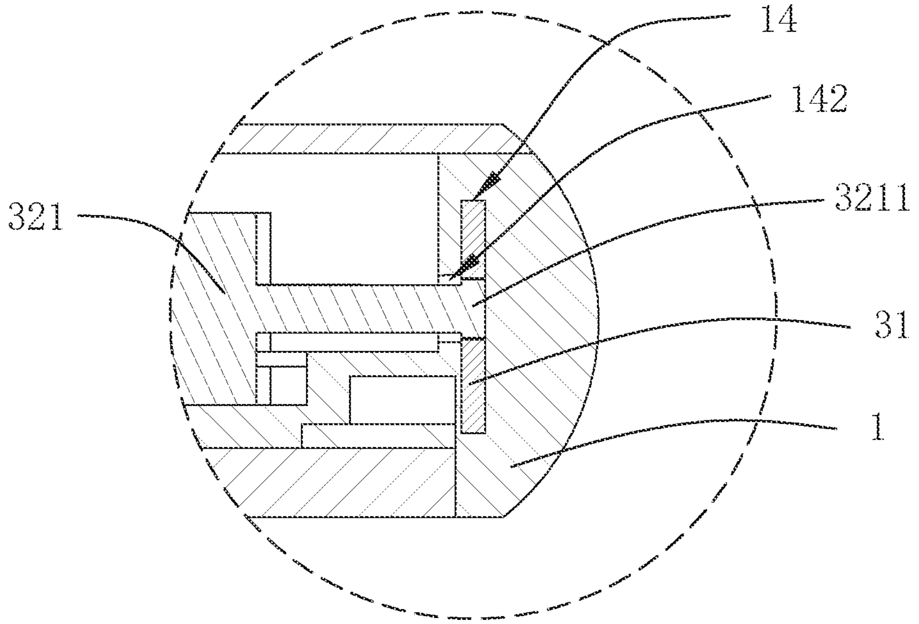
FIG. 15 is an enlarged view of Part d in FIG. 13.

This embodiment provides another electronic terminal 100. Referring to FIG. 11 to FIG. 15, the electronic terminal 100 includes a housing 1, a sound producing device 2 and a switching structure 3 arranged in the housing 1, and a first sound cavity channel 11 and a second sound cavity channel 12 formed in the housing 1 and passing through the housing 1 to be communicated with the outside. The sound producing device 2 defines a sound producing cavity 13 jointly with the housing 1. The sound producing cavity 13 is communicated with the first sound cavity channel 11 and the second sound cavity channel 12. The electronic terminal 100 further includes a mounting groove 14 formed in the housing 1.

The switching structure 3 includes a baffle 31 slidably arranged in the mounting groove 14 and a driving portion 32 driving the baffle 31 to slide in the mounting groove 14. The side of the mounting groove 14 close to the first sound cavity channel 11 is communicated with the first sound cavity channel 11. The side of the mounting groove 14 close to the second sound cavity channel 12 is communicated with the second sound cavity channel 12. The driving portion 32 drives the baffle 31 to slide in the mounting groove 14 into the first sound cavity channel 11 or the second sound cavity channel 12, so as to close the first sound cavity channel 11 or the second sound cavity channel 12

Specifically, an inner side of the housing 1 is recessed to form a first receiving groove 131 and a second receiving groove 132 communicated with each other, the electronic terminal 100 further includes a cover plate 15 received in the housing 1, and the cover plate 15 is arranged to cover the first receiving groove 131 and the second receiving groove 132.

Specifically, the sound producing device 2 is received in the first receiving groove 131 and is spaced from the cover plate 15 to form the sound producing cavity 13, the cover plate 15 and the second receiving groove 132 jointly define the first sound cavity channel 11, the second sound cavity channel 12, and the mounting groove 14, and the mounting groove 14 is located between the first sound cavity channel 11 and the second sound cavity channel 12.

Specifically, the driving portion 32 is a motor 321 arranged in the housing 1, and an output end of the motor 321 is in transmission connection with the baffle 31 to drive the baffle 31 to slide in the mounting groove 14 into the first sound cavity channel 11 or the second sound cavity channel 12.

Specifically, the housing 1 is further provided with a through groove 142 passing therethrough and extending along a sliding direction of the baffle 31, and the output end of the motor 321 passes through the through groove 142 to be in transmission connection with the baffle 31.

Specifically, the housing 1 includes a bottom wall 17, a side wall 171 bending and extending from a periphery of the bottom wall 17, an extension wall 172 formed by horizontally protruding from the side wall 171 to a direction close to the second sound cavity channel 12, and a panel 173 covering the side wall 171.

The first sound cavity channel 11 passes through the side wall 171 to be communicated with the outside, and the second sound cavity channel 12 passes through the extension wall 172 to be communicated with the outside. The first receiving groove 131 and the second receiving groove 132 are formed by recessing the side of the bottom wall 17 close to the panel 173.

Specifically, the output end of the motor 321 is provided with a gear 3211, the baffle 31 is provided with a tooth-shaped structure along a sliding direction of the baffle, and the gear 3211 is engaged with the tooth-shaped structure to realize the transmission connection between the motor 321 and the baffle 31.

Specifically, the baffle 31 is provided with a connecting hole 312 passing therethrough, the connecting hole 312 extends along the sliding direction, and the tooth-shaped structure is a rack 311 fixed to one side of an inner wall of the connecting hole 312 and extending along the sliding direction.

Furthermore, two racks 311 are provided and respectively arranged on two opposite sides of the inner wall of the connecting hole 312. In this way, the racks 311 on the two sides are engaged with the gear 3211, so that the motor 321 can drive the baffle 31 more stably.

In this embodiment, the first sound cavity channel 11 is a receiver sound cavity channel, and the second sound cavity channel 12 is a speaker sound cavity channel.

This embodiment is basically the same as Embodiment 1, but the difference lies in that the driving portion 32 is a motor 321 matching a tooth-shaped structure.

According to the electronic terminal 100 in this embodiment, the motor 321 connected to the baffle 31 is added, so that the baffle 31 can be automatically driven through the motor 321, without requiring a user to sliding the baffle 31, which makes the switching structure 3 more convenient to use.

The above are only embodiments of the present disclosure. It should be pointed out herein that, for those of ordinary skill in the art, improvements can also be made without departing from the creative concept of the present disclosure, all of which fall within the protection scope of the present disclosure.

What is claimed is:

1. An electronic terminal, comprising a housing, a sound producing device and a switching structure that are arranged in the housing, and a first sound cavity channel and a second sound cavity channel that are formed in the housing and passing through the housing to be communicated with outside, wherein the sound producing device and the housing jointly define a sound producing cavity, and the sound producing cavity is communicated with the first sound cavity channel and the second sound cavity channel respectively, wherein the electronic terminal further comprises a mounting groove formed in the housing, and the switching structure comprises a baffle that is slidable in the mounting groove and a driving portion that is configured to drive the baffle to slide in the mounting groove, and a side of the mounting groove close to the first sound cavity channel is communicated with the first sound cavity channel, and a side of the mounting groove close to the second sound cavity channel is communicated with the second sound cavity channel, and the driving portion drives the baffle to slide in the mounting groove into the first sound cavity channel or the second sound cavity channel, to close the first sound cavity channel or the second sound cavity channel;

wherein an inner side of the housing is recessed to form a first receiving groove and a second receiving groove communicated with each other, the electronic terminal further comprises a cover plate received in the housing, and the cover plate covers the first receiving groove and the second receiving groove;

the sound producing device is received in the first receiving groove and is spaced from the cover plate to form the sound producing cavity, the cover plate and the second receiving groove jointly define the first sound cavity channel, the second sound cavity channel, and the mounting groove, and the mounting groove is located between the first sound cavity channel and the second sound cavity channel; and the housing is further provided with a limit groove passing therethrough and extending along a sliding direction of the baffle, the driving portion is a slide arm fixed to the baffle, the slide arm extends into the limit groove and is exposed to the limit groove, and the slide arm slides in the limit groove to drive the baffle to slide in the mounting groove into the first sound cavity channel or the second sound cavity channel.

2. The electronic terminal as described in claim 1, wherein an end of the slide arm away from the baffle is in a same horizontal plane as a side of the limit groove away from the sound producing device.

3. The electronic terminal as described in claim 1, wherein the housing comprises a bottom wall, a side wall bending and extending from a periphery of the bottom wall, an extension wall formed by horizontally protruding from the side wall towards a direction close to the second sound cavity channel, and a panel that covers the side wall;

the first sound cavity channel passes through the side wall to be communicated with outside, and the second sound cavity channel passes through the extension wall to be communicated with outside; and the first receiving groove and the second receiving groove are formed by recessing a side of the bottom wall close to the panel.

* * * * *